United States Patent [19]

Amitay

[11] Patent Number: 5,384,826
[45] Date of Patent: Jan. 24, 1995

[54] DISTRIBUTED PACKETIZED SWITCHING CELLULAR RADIO TELEPHONE COMMUNICATION SYSTEM WITH HANDOFF

[75] Inventor: Noach Amitay, Tinton Falls, N.J.

[73] Assignee: AT&T Bell Laboratories, Murray Hill, N.J.

[21] Appl. No.: 98,759

[22] Filed: Jul. 28, 1993

Related U.S. Application Data

[63] Continuation of Ser. No. 787,714, Nov. 5, 1991, abandoned, which is a continuation-in-part of Ser. No. 591,321, Oct. 1, 1990, abandoned.

[51] Int. Cl.[6] ............... H04M 11/00; G08B 5/00; H04J 3/24; H04J 3/12
[52] U.S. Cl. ................................. 379/60; 370/941; 370/110.1; 379/58; 379/59; 455/331; 455/561
[58] Field of Search ............... 370/85.1, 94.1, 110.1; 375/1; 379/56, 58, 59, 60; 455/31.1, 33.1, 56.1

[56] References Cited

U.S. PATENT DOCUMENTS

| | | | |
|---|---|---|---|
| 3,764,915 | 10/1973 | Cox et al. | 325/53 |
| 4,112,257 | 9/1978 | Frost | 325/55 |
| 4,125,808 | 11/1978 | Graham | 455/33 |
| 4,144,411 | 3/1979 | Frenkiel | 325/53 |
| 4,222,115 | 9/1980 | Cooper et al. | 375/1 |
| 4,284,848 | 8/1981 | Frost | 455/11 |
| 4,301,539 | 11/1981 | Kage | 375/107 |
| 4,383,332 | 5/1983 | Glance et al. | 455/33 |
| 4,485,486 | 11/1984 | Webb et al. | 455/33 |
| 4,613,990 | 9/1986 | Halpern | 455/33 |
| 4,686,671 | 8/1987 | Burian et al. | 370/88 |
| 4,698,839 | 10/1987 | DeVaney et al. | 379/60 |
| 4,701,904 | 10/1987 | Darcie | 370/3 |
| 4,718,081 | 1/1988 | Brenig | 379/60 |
| 4,726,644 | 2/1988 | Mathis | 350/96.16 |
| 4,727,590 | 2/1988 | Kawano et al. | 455/33 |
| 4,759,051 | 7/1988 | Han | 379/59 |
| 4,771,448 | 9/1988 | Koohgoli et al. | 379/60 |
| 4,797,947 | 1/1989 | Labedz . | |
| 4,829,554 | 5/1989 | Barnes et al. | 379/58 |
| 4,864,310 | 9/1989 | Bernard et al. | 342/368 |
| 4,866,431 | 9/1989 | Andros et al. | 340/825.02 |
| 4,881,271 | 11/1989 | Yamaucki et al. | 455/56 |
| 4,887,265 | 12/1989 | Felix | 370/94.1 |
| 4,901,340 | 2/1990 | Parker et al. . | |
| 4,916,460 | 4/1990 | Powell | 343/853 |
| 4,916,691 | 4/1990 | Goodman . | |

(List continued on next page.)

FOREIGN PATENT DOCUMENTS

| | | | |
|---|---|---|---|
| 2625475 | 4/1978 | Germany . | |
| 0029221 | 2/1986 | Japan | 455/33 |
| 0101135 | 5/1987 | Japan | 455/33 |
| 0203025 | 8/1988 | Japan | 455/33 |
| 0012627 | 1/1989 | Japan | 455/33 |

OTHER PUBLICATIONS

Chia, Warburton, "Handover Criteria for City Microcellular Radio Systems", IEEE, Apr. 1990.

(List continued on next page.)

Primary Examiner—Curtis Kuntz
Assistant Examiner—William Cumming
Attorney, Agent, or Firm—Eugene S. Indyk

[57] ABSTRACT

A cellular switching system and architecture is described in which the switching associated with a call originated within one cell but now serviced within another cell is distributed among base stations which are interconnected with each other through a local area network or a packet switch. The routing procedure associated with the point of origin for a given call is stored in the memory of a switch of public switched telephone network. As an active subscriber crosses a cell boundary, the switch routes all packets of information for the given call to the originating base station for the duration of the call. Importantly, each base station then forwards each packet to the subscriber's current base station via the local area network or a packet switch. In this manner, the inventive architecture is unaffected by the increased crossing between cell boundaries since the switching associated with those calls not within the range of the initial base station is handled in a distributed manner by each base station via the local area network or a packet switch.

2 Claims, 8 Drawing Sheets

U.S. PATENT DOCUMENTS

| | | | |
|---|---|---|---|
| 4,916,728 | 4/1990 | Blair | 379/59 |
| 4,972,456 | 11/1990 | Kaczmarek et al. | 379/59 |
| 4,977,589 | 12/1990 | Johnson et al. | 379/59 |
| 5,022,024 | 6/1991 | Paneth et al. | 370/50 |
| 5,036,531 | 7/1991 | Spear | 379/58 |
| 5,040,177 | 8/1991 | Martin et al. | 370/110.1 |
| 5,067,147 | 11/1991 | Lee | 379/60 |
| 5,109,390 | 4/1992 | Gilhousen et al. | 375/1 |
| 5,128,959 | 7/1992 | Bruckert | 375/1 |
| 5,181,200 | 1/1993 | Harrison | 370/85.1 |
| 5,195,090 | 3/1993 | Balliger et al. | 370/94.1 |
| 5,195,127 | 3/1993 | Ichikawa et al. | 379/58 |

OTHER PUBLICATIONS

Ikeda, Akiyama, Hoshida, "Land Mobile Telephone Switching Equipment", Review of the ECL, Nov. 1977.

Chadha, Honnicutt, Peck, Tebes, "Mobile Telephone Switching Office", The Bell Systems Technical Journal, Jan. 1979.

Jeffery, "AN Automatic Radio Telephone System", Conference or Land Mobile Radio, Bailrigg, Lancaster, England, U.K. Sep. 1979.

Ballard, Issenmann, Sanchez, "Cellular Mobile radio as an Intelligent Network Application" Elec. Comm Oct. 1989.

Taub and Schilling, "Principles of Communications System" 1986, pp. 282–286.

R. Steele et al., "High–User–Density Digital Cellular . . . ", IEE Proceedings, vol. 132, Pt. F., No. 5, Aug. 1985, pp. 396–404.

D. J. Goodman, "Cellular Packet Communications," IEEE Trans. on Comm., vol. 38, No. 8, Aug. 1990, pp. 1272–1280.

R. Steele, "The Cellular Environment of Lightweight Handheld Portables," IEEE Comm. Magazine, vol. 27, No. 7, Jul. 1989, pp. 20–29.

R. Steele et al., "Towards a High–Capacity Digital Cellular Mobile Radio System", IEEE Proceedings, vol. 132, No. 5, Aug. 1985, pp. 405–415.

D. McKay, "Moving RF Over Fiber Optics", Communications Magazine of Mobile Radio Professionals, Oct. 1988, pp. 30–36.

Chesson, G. L., "Datakit Software Architecture", 1979 Int'l Conf. on Comm. Part II, Jun. 10–14, 1979, pp. 20.2.1–2.5.

Chesson, G. L. et al., "Datakit Network Architecture", COMPCON Spring 1980, VLSI: New Architectural Horizons, Feb. 25–28, 1980, pp. 59–61.

Chu, W. W. et al., "Experimental Results on the Packet Satellite Network", NT Conf. Rec. Nat'l Telecommun. Conference, Nov. 27–29, 1979, pp. 45.4.1–4.12.

Fraser, A. G., "Datakit–A Modular Network For Synchronous and Asynchronous Traffic", 1979 Int'l Conference on Communications Part II, Jun. 101 $\propto$ 14, 1979, pp. 20.1.1–1.3.

Goodman, D. J. et al., "Packet Reservation Multiple Access For Local Wireless Communications", IEEE Transactions on Communications, vol. 37, No. 8, Aug. 1989, pp. 885–890.

Goodman, D. J., "The Near/Far Effect of Local ALOHA Radio Communications", IEEE Trans. on Vehicular Tech., vol. VT-36, No. 1, Feb. 1987, pp. 19–27.

Kahn, R. E., "The Introduction of Packet Satellite Comm." Advanced Research Projects Agency, pp. 45.1.1–1.8.

Rammamurthi, B. et al., "Perfect Capture ALOHA for Local radio Comm.", IEEE Jour. on Selected Areas in Communications, vol. SAC-5, No. 5, Jun. 1987, pp. 806–814.

Jacobs, I. M. et al., "Packet Satellite Network Design Issues", NTC Conf. Rec. Nat'l. Telecommun. Conf., Nov. 27–29, 1979, pp. 45.2.1–2.12.

Jacobs, I. M. et al., "General Purpose Packet Satellite Networks", Proc. of the IEE vol. 66, No. 11, No. 1978, pp. 1448–1467.

Tannenbaum, A. A., "Computer Networks", New Jersey: Prentice Hall, Inc., 1981, pp. 249–285.

Kleinrock, L., "Queuing Systems", New York: John Wiley & Sons, 1976, pp. 360–393.

"Datakit® II VCS System Description", AT&T issue 1, Copyright 1989, pp. 1.1–3.45.

DISTRIBUTED PACKETIZED SWITCHING CELLULAR RADIO TELEPHONE COMMUNICATION SYSTEM WITH HANDOFF

CROSS REFERENCE TO RELATED APPLICATIONS

This application is a continuation of application Ser. No. 07/787,714, filed Nov. 5, 1991, now abandoned, which is a continuation-in-part of application Ser. No. 07/591,321, filed Oct. 1, 1990, now abandoned.

TECHNICAL FIELD

The present invention relates to communication systems and, in particular, to a cellular mobile communication system.

BACKGROUND OF THE INVENTION

Mobile telephone service provides a means for telephone conversations to be originated from or terminated at, a moving vehicle or portable unit. Typically, frequency modulation (FM) radio channels are used as links between mobile units comprising wireless terminals and a mobile telephone switching office (MTSO) via base stations that serve geographically localized mobile subscribers. Furthermore, cellular techniques are presently utilized in order to enable high volume traffic to operate over a limited number of available radio channels allocated by the Federal Communications Commission (FCC). Typically, in cellular systems, by dividing large geographical areas, called cells, into smaller geographical areas or microcells, the same radio channels in different microcells may be reused.

While this new cellular architecture greatly increases the traffic volume which may be handled, sophisticated routing and switching equipment is required to maintain the integrity of each call as a subscriber moves from one cell to another. In particular, as an active subscriber moves from cell to cell, the switching system assigns a new radio frequency channel and, moreover, assigns appropriate communications resources to route signals from and to the new cell and the called party. Unfortunately, as the number of active subscribers increases dramatically and the size of the cell is further decreased in order to handle the traffic volume, a greater demand is placed on the switching architecture because of the increased frequency with which active subscribers cross cell boundaries. It is anticipated that within the next few years, the required switching capacity will become prohibitively large for existing mobile cellular switches and the associated mobile network architectures.

Various proposals have been suggested to alleviate the anticipated demand for mobile radio service. While larger cellular switches may be able to handle the increase traffic volume, they are relatively expensive and may not be readily available for short terms needs. More importantly, circuit switch architectures and network architectures of present cellular systems generally do not afford extended coverage on demand. In particular, D. J. Goodman has suggested a switching architecture which greatly relieve the switching burden due to increasing boundary crossing as cellular cells become smaller. See U.S. Pat. No. 4,916,691, which is commonly assigned and incorporated herein by reference. In particular, Goodman teaches dividing packet of information into two segments; those which change with cells as a subscriber crosses a cell boundary and those that do not change as the active subscriber moves from cell to cell. Routing procedures associated with information which do not change between cell boundaries may be stored in the memory of the switch only once, at the beginning of the call. However, routing procedures associated with the information that do change may be derived from the header of its packet received by the switch. As such, an exemplary switching architecture would comprise two separate units, one of which establishes the initial route and the other which is used to vary only that portion of the header which changes as a subscriber crosses a cell boundary. While this cellular architecture and the associated infrastructure permits rapid growth by distributing many of the switching and control functions to additional modulator units which may be added as warranted by the traffic volume, it is highly desirable to mitigate the need for additional modular units, reduce the complexity of switching operations associated therewith and further reduce the switching burden on switches.

SUMMARY OF THE INVENTION

This invention is a new switching system and architecture which is particularly effective in addressing the problem of increased switching burden due to the increasing frequency of boundary crossings as cellular radio cells become smaller. An important aspect of the invention lies in the realization that a large percentage of the switching and control functions can be distributed among base stations, which serve a number of individual subcells or microcells, as well as individual wireless terminals, i.e., subscribers. The routing procedure associated with the point of origin for a given call may be stored in the memory of the switch. As an active subscriber crosses a cell boundary, the switch forwards all packets of information for the given call to the originating cell for the duration of the call. Importantly, each subscriber informs the base station of its current location such that each base station may forward each packet to the subscriber's current base station via a high speed local area network a packet switch, which interconnects each base station. In this manner, the inventive architecture is unaffected by the increased crossing between cell boundaries since traffic consisting of those calls not within the range of the initial base station are placed on the local area network or are passed through the packet switch. As such, because subscribers continuously inform base stations of their current location and, upon subscribers movement into a new cell, base stations forward information to the subscriber's current base station, the exchange switch plays no role in the hand over process. Instead, the switching or routing associated with subscribers moving from cell to cell is accomplished in a distributed manner by each base station which is linked to one another by a local area network or a packet switch. Additionally, most of the hand over and switching of packets between cells over the local area network or a packet switch may be accomplished by real time translation or memory/bus transfer operations, which are relatively simple operations. In an embodiment of the invention, each base station is connected to other base stations via a local area network or a packet switch utilizing a form of digital transmission commonly known as time division multiple access (TDMA).

In a specific embodiment of the invention, clusters of microcells typically serving subscribers from a fixed canisters that are mounted on lamp posts, utility poles and the like route calls from and to mobile subscribers via base stations through optical fibers. Each base station routes calls to the nearest exchange office via T1 or subscriber loop carrier (SLC) transmission lines, leaving most of initial switching functions to be performed by the exchange switch. Additionally, each base station is connected to other base stations through a high transmission capacity local area network (LAN), or a metropolitan area network (MAN) such that calls initially routed to one base station will always be routed to that station even if the present subscriber is located within the service area of another base station. As such, routing will be established from the original base station to the current base station of the subscriber through the local area network. Thus, the local area network serves only those calls that did not remain within the range of the initial base station but moved during the duration of the call.

In another specific embodiment, each base station is connected to the other base stations by means of a packet switch instead of the local area network referred to above. As in the previous embodiment described above, calls initially routed to one of the base stations will always be routed to that base station even if the subscriber moves to the service area of another base station. In that case, the routing of the call will be established between the new base station and the initial base station through the packet switch.

BRIEF DESCRIPTION OF THE DRAWING

A more complete understanding of the invention may be obtained by reading the following description in conjunction with the appended drawing in which.

DETAILED DESCRIPTION

Figure 1:
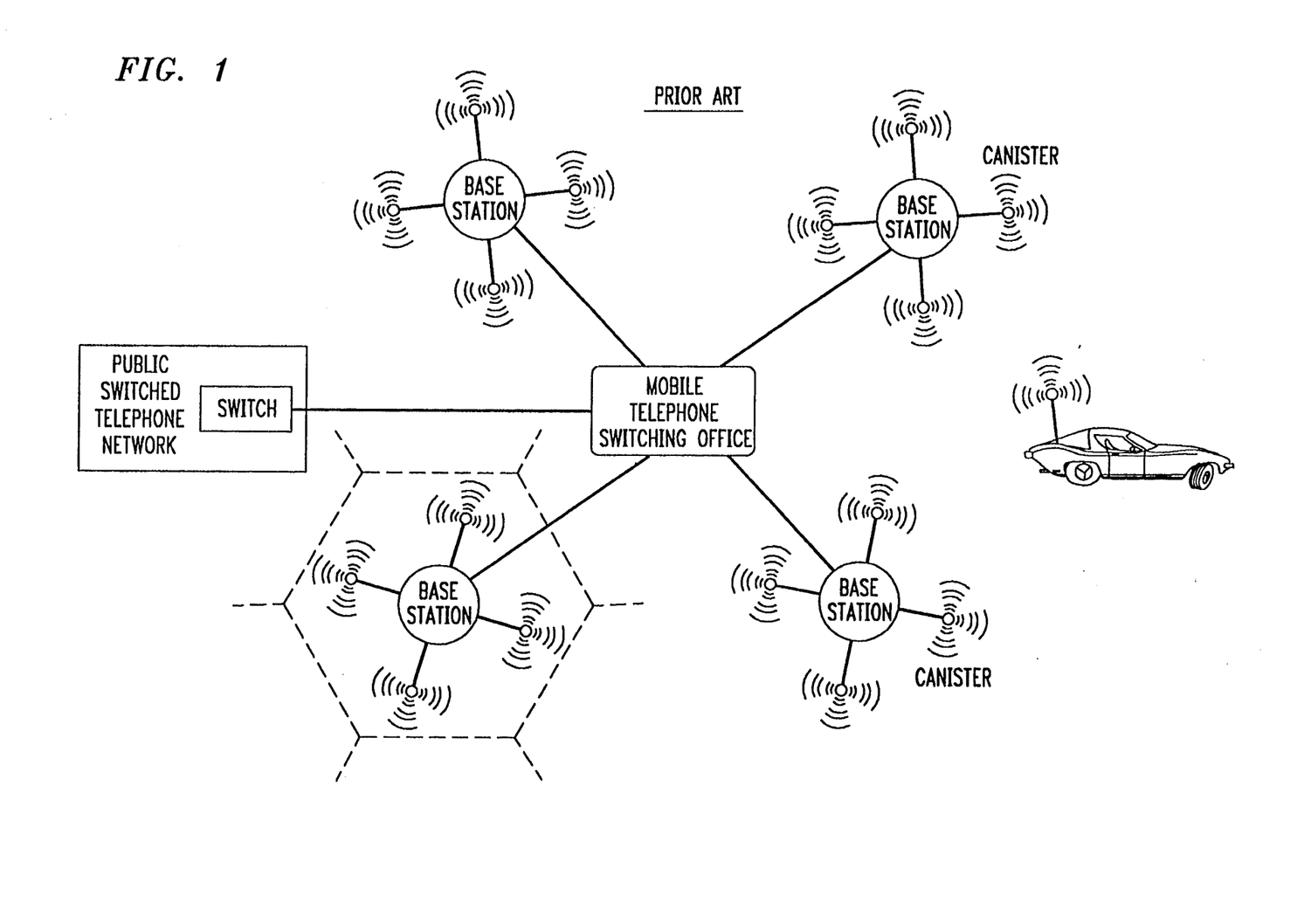
FIG. 1 is a schematic representation of a prior art cellular telecommunications system.

Typically, cellular systems are conceptualized as a packing of hexagonal geographical areas, or cells, each having definite and sharp boundaries between adjacent cells, as shown in FIG. 1. As cellular systems become more popular, the cells become saturated due to the present of more active subscribers within a given cell than there are available channels, that is allocated radio frequencies or time slots. Advantageously, cellular radio has within it an inherent technique, called "cell splitting", for dealing with such an increase in subscribers. In utilizing "cell splitting", the size of the cell is reduced to smaller geographical areas, called microcells, permitting the reuse of the same radio channels in different microcells, each covering a non-interfering defined coverage area. See, for example, R. Steele et al., Proc. IEEE, Part F, Vol. 132 No. 5, pp. 396–404 (1985). As further illustrated in FIG. 1, in order to provide wireless access to public switched telephone networks (PSTNs), current cellular systems contain wireless terminals, base stations, and at least one mobile telephone switching office (MTSO). The MTSO is connected to a plurality of base stations, each which may be linked via coaxial or optical fiber lines to a plurality of canisters, which serve to transmit and receive radio signals from localized mobile subscribers defined within the boundary of a microcell. That is, radiation coverage of a given cell may be accomplished by an overlapping grid-like pattern of radiation from canisters each comprising a transducer. Accordingly, each canister communicates to mobile subscribers by way of two way radio signals to the transducers and, then to the base station, via optical fibers, coaxial cables and the like. Typically, these canisters may be mounted on lamp posts, utility poles and the like, and moreover, may utilize a lineal line-of-sight coverage of 200–2000 foot segment of roadway. Thus, these canisters act as a grid-like distributed antenna for both transmitting and receiving radio signals. The infrastructure of such a system is the combination of hardware and software that links base stations with cellular switches and cellular switches with one another as well as PSTN subscribers. See, for example, co-pending U.S. application Ser. No. [Chu-Gans 12-32], filed Mar. 11, 1991, which is a continuation of U.S. application Ser. No. 07/576,119, filed Aug. 23, 1990, which is a continuation of U.S. application Ser. No. 333,490, which is commonly assigned.

As described earlier, the complexity of a cellular system is due in pan to the mobility of the subscriber. In contrast to a network system for fixed subscribers, in order to establish a call, a cellular system must identify the location of the subscriber and, more importantly, must hand off the call between cells, as well as microcells, as the subscriber moves from one cell to another. As cells become smaller, the number of hand offs between cells, specifically, base station to base station, becomes prohibitively large, overwhelming the switching capacity of the cellular switch.

The inventive cellular communication system in order to increase the switching capacity of present networks exploits a distributed communication architecture to distribute and, thus, off load the switching to each base station and indirectly to each wireless terminal or subscriber. Furthermore, by connecting base stations directly to the nearest local exchange office of the PSTN via a high speed transmission line, most of the switching, other than the switching associated with cell crossings by subscribers, is handled by the local exchange office. As such, the need for any MTSO is obviated.

Figure 2:
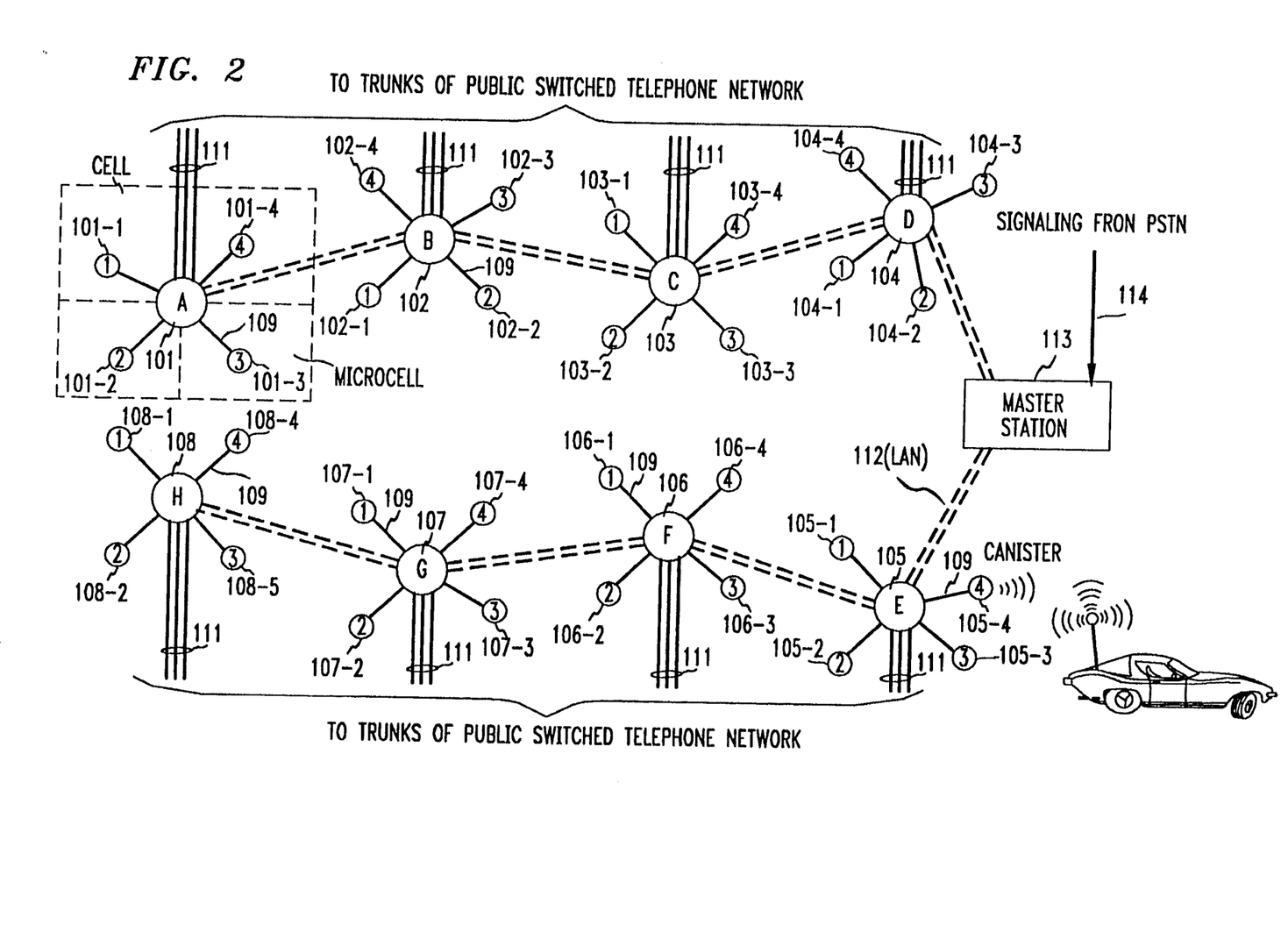
FIG. 2 is a schematic representation of an embodiment of the inventive cellular communication system.

Shown in FIG. 2 is an exemplary system architecture for a mobile cellular communication system in accordance with the principles of the invention. In addition to extending coverage to mobile subscribers, the system may serve stationary subscribers and, thus, more properly could be referred to as a "personal and microcellular communication system". While the exemplary cellular network system is described in terms of "calls", it is to be understood, however, that the term "call" as used here, and in the system depicted, includes any type of communications, such as the transmission of data, facsimile, audio, video, and the like.

As shown in FIG. 2, the exemplary mobile cellular system comprises base stations 101 through 108, each which serve a distinct geographical area or cell. Further, each base station is connected to the trunks of the public switched telephone network (PSTN). In the preferred embodiment, each base station is connected to closest exchange office for the PSTN via high transmission lines 111, for example operating at 1.544 Mbps, such as a T1 transmission line having twenty-four two-way voice channels. It is contemplated, however that a subscriber loop carrier (SLC) line handling thirty-two two-way voice channels may also be utilized. Each base station accepts and delivers information in the standard format of the PSTN. For example, the voice format may be 64 kb/s companded pulse code modulation. Furthermore, the base station converts this information to and from the format of the wireless terminal access physical layer by means such as transcoders and channel coders corresponding to the access environment of the mobile subscriber. Each base station sends packets to the appropriate canister by inspecting the packet header and, then routing the packets accordingly as indicated by a look up table.

Canisters 101-1 through 101-4, 102-1 through 102-4, etc, each comprising a transducer for communicating to and from mobile subscribers via radio signals are interconnected with their respective base station via a network of optical fibers 109. It should be noted that coaxial cables may replace optical fibers 109. From base stations, calls are sent over trunks of transmission lines 111 to exchange offices of the PSTN for subsequent routing to the called party. For ease of explanation in the proceeding description, base stations 101 through 108 have the literal designation A through F, respectively, while each canister has been numbered 1 through 4, as shown in FIG. 2.

A mobile subscriber in a given microcell by analyzing measurements of signal strength and channel availability determines the optimal microcell, that is canister, for establishing communication to the base station and, then, the called party. Importantly, for the duration of the call, the original line assignment selected on high speed transmission lines 111 is used for sending and receiving packets of information. In order to assure smooth flow of communication packets to the originally assigned line, each subscriber supplies in each of its transmitted packets his present base station and canister identification as well as his original base station and line assignment, e.g. A4/A-4T14 (current location: base station A, canister 4; original location: base station A; 14th channel assignment on one of 24 channels available on the fourth T1 transmission line). It is contemplated that communication from the subscriber to the base stations may be either analog or digital. In either case, subscribers would communicate via well-known techniques for sharing limited radio channel resources among a large number of users, such as time division multiple access (TDMA), frequency division multiplexing (FDM) and the like.

Network Control Examples

By referring to three examples: subscriber initiated calls, hand overs between base stations and outside subscriber initiated calls, we show how the inventive cellular communication system organizes and controls the flow of subscriber information and system control information. More importantly, these examples show how the switching burden is distributed among base stations, particularly in the case for increased crossings between cell boundaries by mobile subscribers.

Subscriber Initiated Calls

Figure 3:
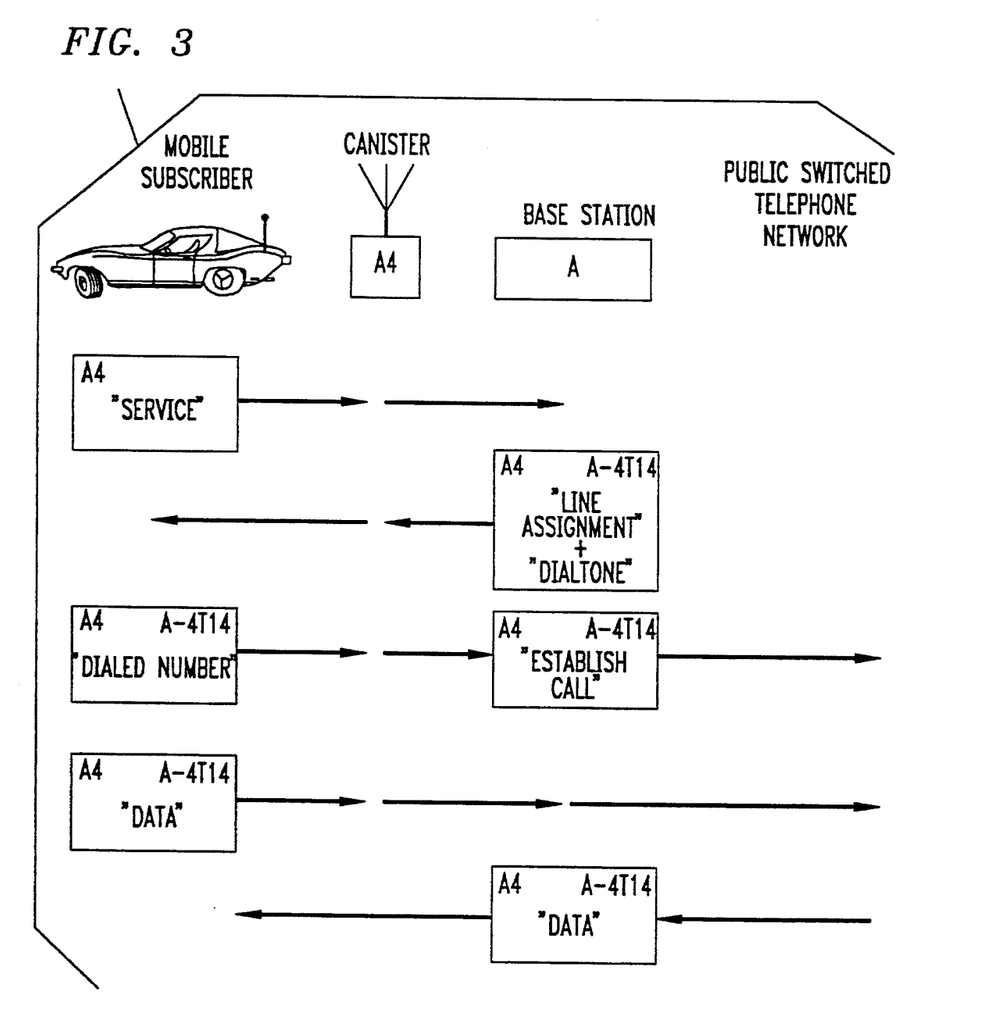
FIGS. 3 through 6 are schematic representations of hand over protocols using the inventive cellular communication system.

FIG. 3 shows one exemplary scenario for establishing a call set up from a mobile subscriber to a called party. It should be noted that in FIG. 3, each packet is represented by a illustrative "postcard" in which the present base station and canister identification are shown in the upper left hand of the postcard, the original base station/line assignment is shown in the upper fight hand portion of the postcard, and the data or "information field" is shown in the center portion. In this figure, the horizontal direction represents location and the vertical direction represents time, with the sequence of packet transfer from top to bottom. Each packet is indicated by a rectangle.

First, the subscriber determines the optimal microcell for establishing communication to a called party based on the signal strength to the nearest canister associated with the microcell. Accordingly, the subscriber then sends to the chosen canister its current location, for example A4, designating base station A, and canister or microcell 4. Canister A4 relays the message and the identity of the subscriber to base station A via fiber 109. It is contemplated that the canister may comprise a radio frequency detector and associated circuitry to modulate a laser transmitted for transmitting optical signals to the base station. The base station uses the message received to authenticate the calling subscriber and, if the caller is authorized to place a call, assigns a line for the call, stores the base station and canister ID, and informs the canister as to its line assignment, for example 4T14 designating channel 14 on the fourth T1 transmission line 111. Additionally, the base station sends a dial tone to the subscriber as well as its assigned line trunk via canister A4. The mobile subscriber stores the assigned line in order to send in future packet its present location and given line allocation, such as A4-/A-4T14, indicating: present base station A and canister 4; original base station A; and channel assignment 14 on the fourth T1 line. Further, the subscriber in response to the dial tone sends a packet containing the called party's number. This enables the base station to attempt to establish a connection through the PSTN vis-a-vis the local exchange office switch to the called party. Importantly, responses from the called party and subscriber are routed for the duration of the call through the originally chosen base station and trunk line, in this example base station A and trunk line 4T14, respectively.

As long as the subscriber remains in a single microcell, packets move from the wireless terminal to base station to the central exchange office in a straightforward manner. Typically, the bidirectional flow of speech information consists of a sequence of talk spurts, alternating in direction, with each talk spurt containing several packets. Typically, the wireless terminal through which the subscriber sends packets of information may contain a speech activity detector such that no packets are generated in the silent gaps between talk spurts.

Hand Over Between Base Stations

Figure 4:
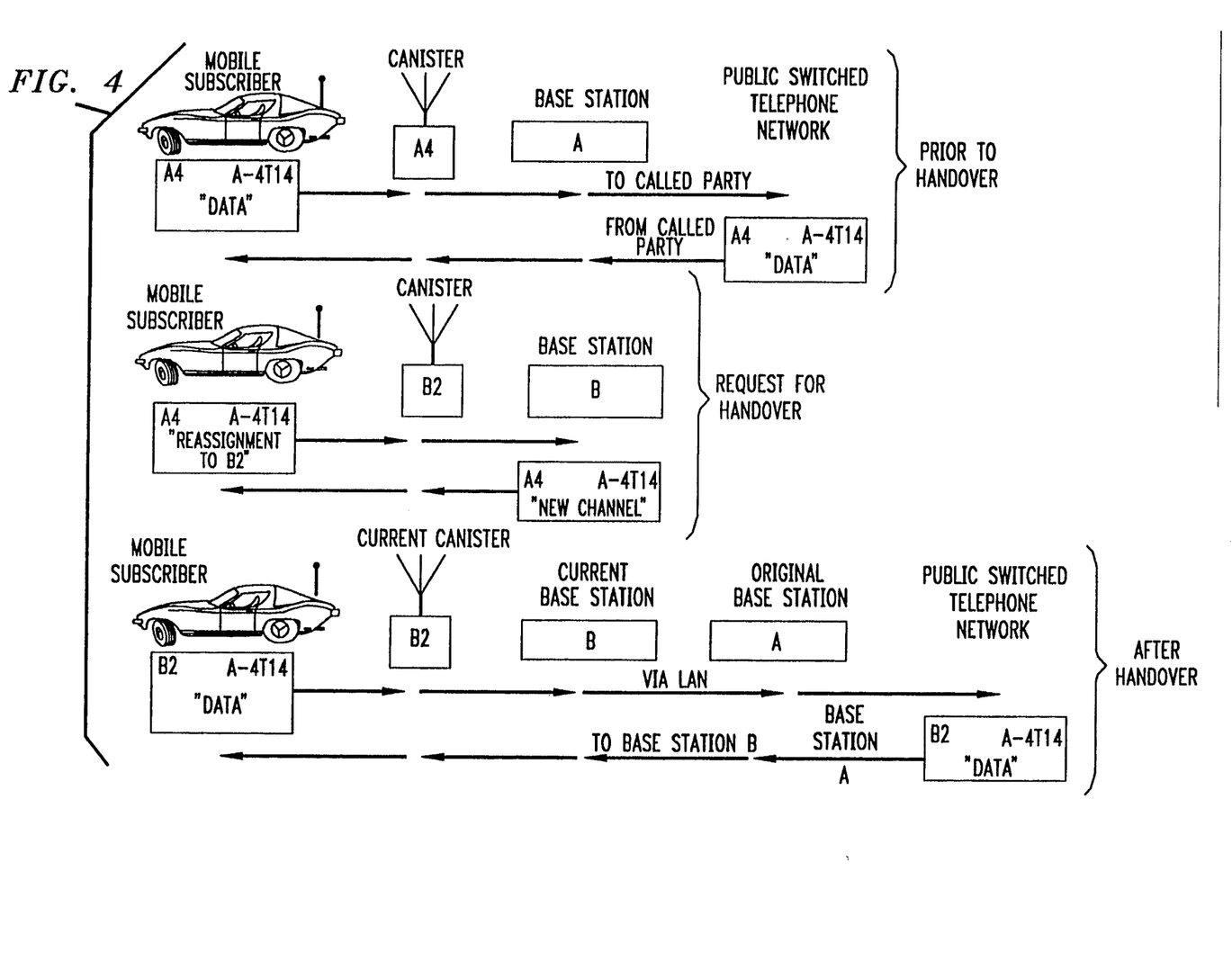

The inventive cellular communication system hands a call from one base station to another when the wireless terminal (subscriber) determines that the call can best be handled by another canister within a new base station. FIG. 4 is a schematic representation of an exemplary hand over protocol in accordance with the principles of the invention. Initially, the terminal initiates the hand over by requesting for channel assignment in the new base station and respective canister, for example, from A4 to B2. It should be recalled that each wireless terminal sends in its packet header its current base station and canister location as well as its previous base station location and line trunk assignment, thus off loading from the base station any resources required for tracking. Upon a request from the subscriber for channel assignment in the new base station, base station B assigns a new radio channel and informs the subscriber of the new assigned radio channel. Accordingly, the subscriber modifies its packet header for all future packets containing its present location, previous location, and assigned line. New base station B identifies all newly received packets from the subscriber and sends the packets to the original base station A via the local area network, which operates at a high transmission rate. Various local area networks are well known in the art which may be utilized and, hence, are not discussed here. When the previous base station, here station A, receives the packets, data is sent through the original assigned channel to the PSTN. Moreover, base station A updates the subscriber current location in a translational look up table to forward all received packets for the subscriber to base station B via the local area network. Because the exchange office plays no role in the hand over process, or calls from one base station to another or cell to cell, its work load is unaffected by the volume of hand overs, and thus may be extremely high.

It should be noted that the subscriber constantly monitors for the best base station and canister to communicate with the called party. If the optimum canister is within the original base station, a request is made for service from that canister. Packets from the called party are send to same base station, but routed to a different canister by means such as packet switching based on translational look up tables, which are well-known in the art.

Figure 5:
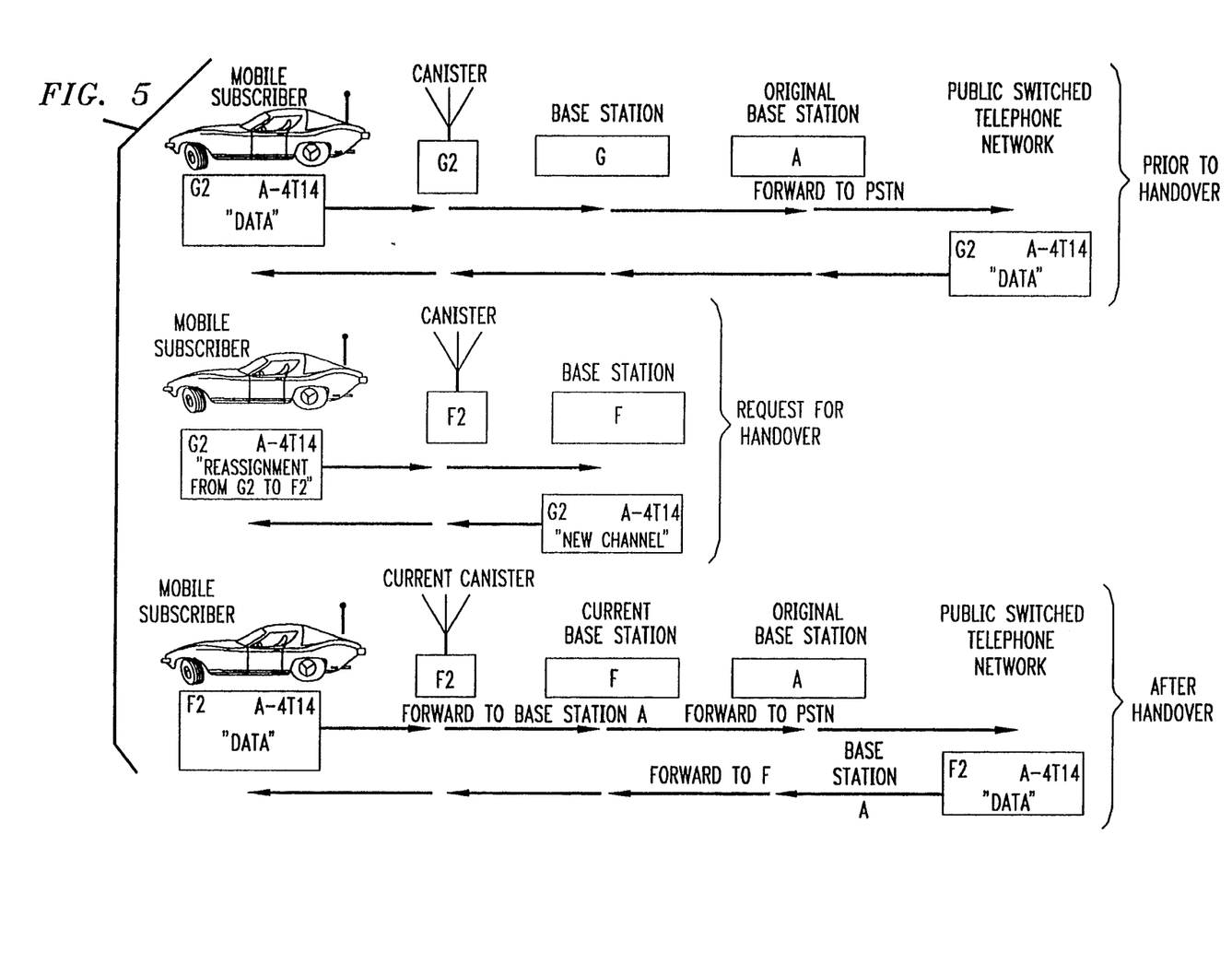

In the scenario where the change of base station is far from the original base station, such as from G2 to F2, that is, the subscriber originated the call from location A4 and is now requesting a reassignment from G2 to F2, the subscriber's request for reassignment is made to base station F. FIG. 5 is a schematic representation of an exemplary hand over protocol. Base station F informs the subscriber as to its new channel assignment such that the subscriber modifies its packet header to F2/A-4T14, indicating its current location, prior location and line assignment. Importantly, base station G stores the forwarding address, e.g. F2/A4T14, so that packets already routed to base station G will be forwarded to base station F. Subsequently, base station G erases the prior assignment from its forwarding look up table after a certain prescribed time which is related to the size of the local area network. Packets from the mobile subscriber are send to base station/canister F2, with base station F routing information packets to base station A via the local area network. With base station A storing the subscriber's line assignment and modifying the subscriber's current location in its look up table, base station A sends packets received from the PSTN to base station F.

Public Subscriber Initiated Calls

Figure 6:
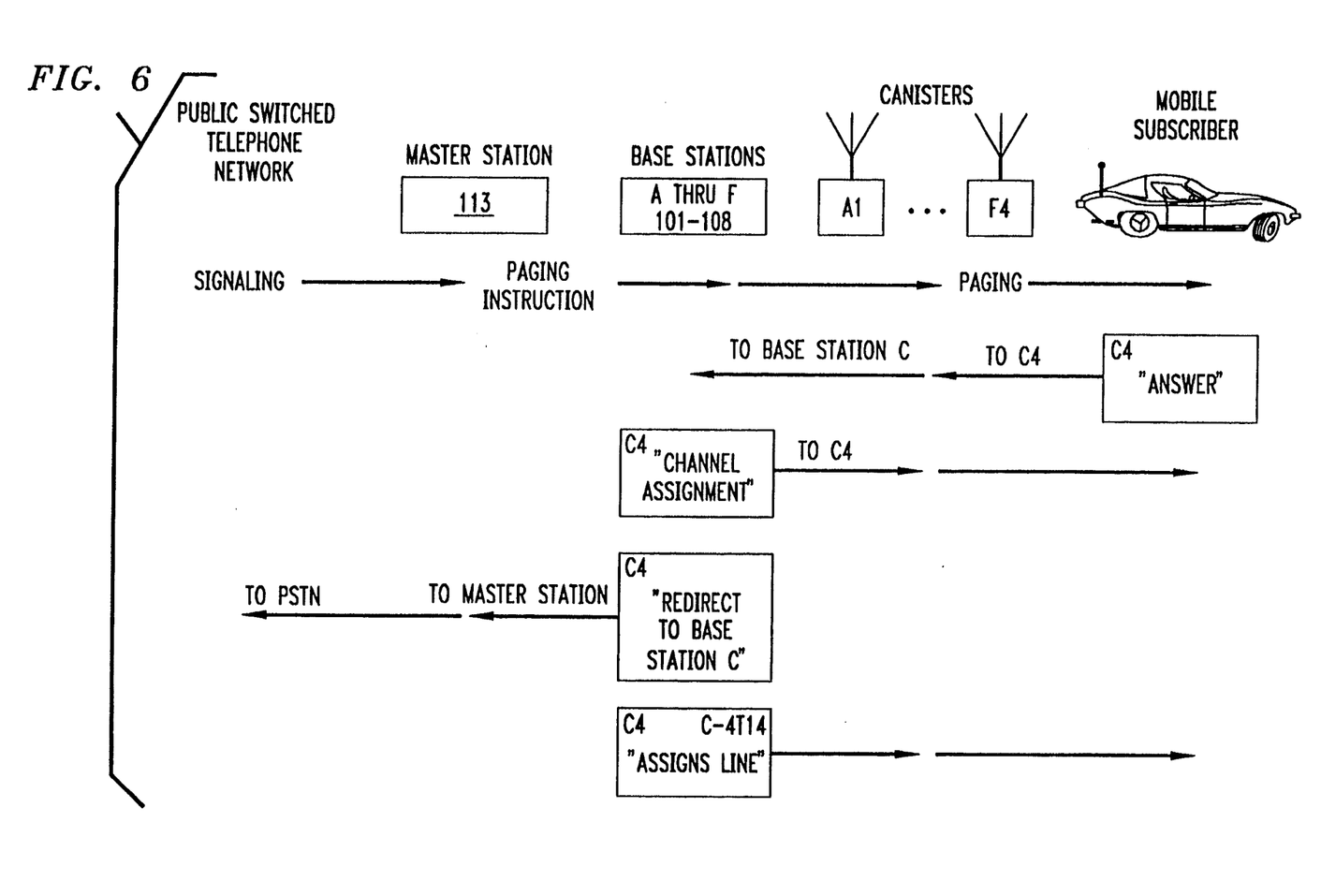

When a call is originated from a outside party to a mobile subscriber, the signaling is routed to master base station 113, as shown in FIG. 6. Master station 113 pages all base stations 101 through 108 to locate the called mobile subscriber. Upon locating the subscriber, the subscriber answers through the optimum canister, for example canister C4, and informs the base station of its current canister and base station location. The base station assigns a channel for the call and notifies master station 113 to redirect the outside signaling to the exchange office of the current subscriber's base station. The base station receives the incoming call and assigns a trunk line for the call, storing the base and canister ID for subsequent resource allocation, e.g. C4/C-8T17. The base station sends a ring tone to the subscriber and its line assignment, with the subscriber storing the line assignment. As discussed above, movement from cell to cell, that is hand off from cell to cell is effectuated in a similar manner.

Figure 7:
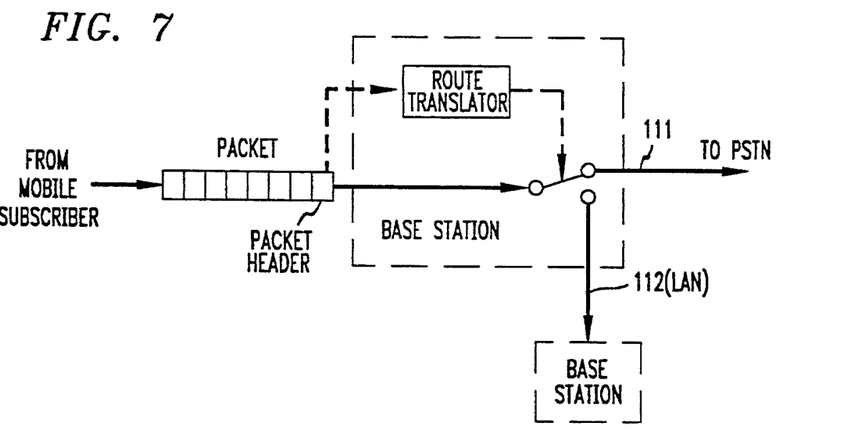
FIGS. 7 through 9 are schematic representations of routing by the base stations typical for the inventive cellular communications system.
Figure 8:
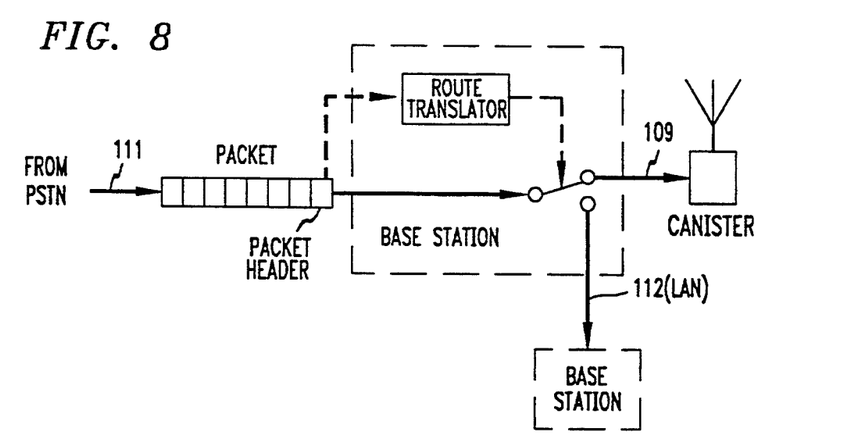
Figure 9:
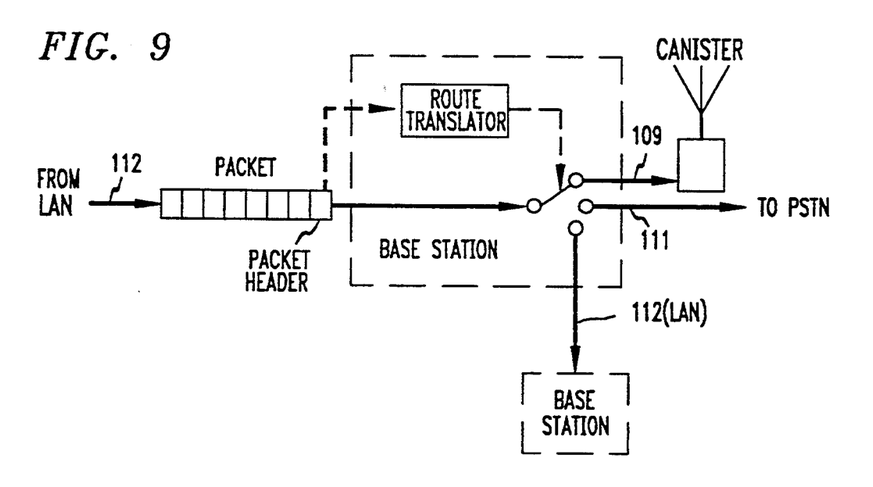

It should be noted that the above hand over protocols are for illustrative purposes only and various alternative protocols exist which fall within the scope of the invention. Those skilled in the art will readily note that most of the hand over procedures from base station to base station or canister to canister can be implemented with simple route translation and memory/bus transfer operations, as noted above. Shown in FIGS. 7 through 9 are exemplary routes among the PSTN, local area network, canisters and base stations for the flow of packets of information between a mobile subscriber and called party. It should be noted that information packets from subscribers are either directly routed by base stations to the PSTN or relayed to another base station by means of the local area network. The address field, that is base station/canister, in each packet header provides the routing information to base stations corresponding to appropriate destination of each packet. Similarly, packets received by base stations from the PSTN are routed to appropriate canisters for communicating with the subscriber or routed via the local area network to the appropriate base station corresponding to the address field in each packet header. As described earlier, information packets send over the local area network are routed to a canister, base station or the PSTN, as shown in FIG. 8.

Although the foregoing embodiment has been described as an example with eight base stations each with four canister or microcells, the invention also is contemplated to operate with many more or less base stations and canisters.

An Alternative Network Architecture

Figure 10:
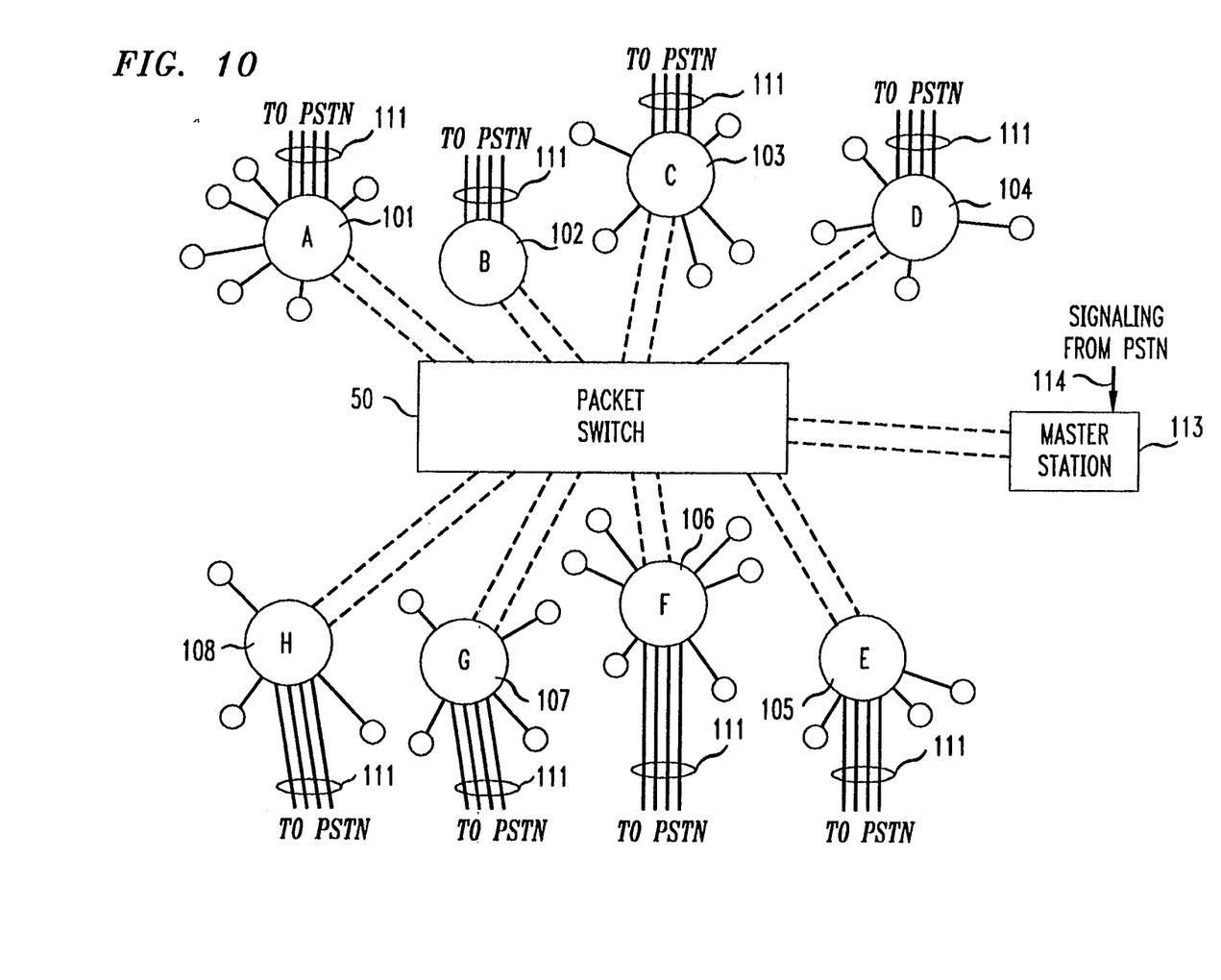
FIG. 10 is a schematic representation of another embodiment of this invention.

FIG. 10 is another example of a cellular network architecture which is useful in carrying out this invention. The architecture of FIG. 10 is similar to that of FIG. 2 except that instead of a local area network or a metropolitan area network interconnecting the base stations, a packet switch 50 is used to interconnect the base stations as indicated by the dotted lines in FIG. 10. The forwarding of signals received by various base stations in the architecture of FIG. 10 to base stations which had originated a phone call to or from a cellular subscriber to or from the public switched telephone network and another party is done via the packet switch 50 rather than through a local area network or a metropolitan area network as shown in FIG. 2. The operation of the architecture of FIG. 10 is otherwise the same and a description of such is not repeated here.

I claim:

1. A packetized cellular communications system, comprising:
   a plurality of base stations, each respective base station being directly connected to a public switched telephone network by means of at least one transmission line defining a plurality of communications channels between the respective base station and the public switched telephone network and;
   a means independent of the public switched telephone network for interconnecting the plurality of base stations;
   each respective base station, comprising:

a means for receiving communications packets from a cellular subscriber in the respective base station, the packets comprising a present base station identification representing a current location of a cellular subscriber, an original base station identification representing where a call to which the communications packets are associated was initiated, and a line assignment representing one of the communications channels between a base station and the public switched telephone network; and a means for selectively directing the communications packets received by the respective base station to one of:

(a) the public switched telephone network by means of one of the communications channels between the respective base station and the public switched telephone network; and (b) the public switched telephone network through the interconnecting means, an original base station, different from the respective base station, where a call associated with the communications packets was initiated, and one of the communications channels between the original base station and the public switched telephone network, in response to the present base station identification, the original base station identification, and the line assignment.

2. The cellular communications system of claim 1, in which each respective base station further comprises:

a means for selectively directing communications packets associated with signals received from the public switched telephone network to one of:

(a) a cellular subscriber connected to the respective base station by means of a wireless communications channel between the cellular subscriber and the respective base station when a call associated with the communications packets from the public switched telephone network was initiated at the respective base station and has not been handed-off from the respective base station; and (b) a cellular subscriber connected by means of a wireless communications channel to another base station after at least one hand-off from the respective base station by way of the interconnecting means.

* * * * *